United States Patent
Yang et al.

(10) Patent No.: US 8,208,761 B2
(45) Date of Patent: Jun. 26, 2012

(54) IMAGE FORMAT CONVERSION SYSTEM

(75) Inventors: Ho-Hsing Yang, Jhubei (TW); Chung-Ho Yan, Sinying (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 637 days.

(21) Appl. No.: 12/457,472

(22) Filed: Jun. 11, 2009

(65) Prior Publication Data

US 2009/0317013 A1 Dec. 24, 2009

(30) Foreign Application Priority Data

Jun. 24, 2008 (TW) .............................. 97123495 A (51) Int. Cl.
*G06K 9/32* (2006.01)
*G06K 9/40* (2006.01)
*H04N 5/232* (2006.01)

(52) U.S. Cl. ..................... 382/300; 382/260; 348/448

(58) Field of Classification Search ............ 382/254, 382/260, 276, 298–300, 305, 312; 348/441, 348/448, 581; 345/603, 606, 660; 358/1.2, 358/525, 528

See application file for complete search history.

(56) References Cited

U.S. PATENT DOCUMENTS

| | | | | |
|---|---|---|---|---|
| 4,709,394 A * | 11/1987 | Bessler et al. | ................ | 382/240 |
| 5,739,867 A | 4/1998 | Eglit | | |
| 5,828,415 A * | 10/1998 | Keating et al. | ................ | 348/458 |
| 6,256,068 B1 * | 7/2001 | Takada et al. | ................ | 348/441 |
| 6,456,329 B1 * | 9/2002 | Tinker et al. | ................ | 348/448 |
| 6,483,951 B1 * | 11/2002 | Mendenhall et al. | ......... | 382/300 |
| 6,788,353 B2 * | 9/2004 | Wredenhagen et al. | ...... | 348/581 |
| 6,791,609 B2 * | 9/2004 | Yamauchi et al. | ............ | 348/273 |
| 7,330,209 B2 * | 2/2008 | Osamato | ...................... | 348/273 |

* cited by examiner

*Primary Examiner* — Kanjibhai Patel
(74) *Attorney, Agent, or Firm* — Bacon & Thomas, PLLC (57) ABSTRACT

An image format conversion system includes a horizontal filter to receive an image input signal with a frequency of a first clock signal in order to perform a filtering operation to thereby produce a horizontal filtering image signal; a first FIFO to temporarily store the horizontal filtering image signal; a 2D image interpolator to perform a deinterlacing, a vertical interpolation and a horizontal interpolation operations on the horizontal filtering image signal to further produce a scaled progressive image signal; a second FIFO connected to the 2D image interpolator to temporarily store the scaled progressive image signal; an interpolation clock controller to receive a second clock signal and produce multiple enable signals in order to enable the horizontal filter and the 2D image interpolator, wherein the second clock signal has a frequency independent of the frequency of the first clock signal.

10 Claims, 7 Drawing Sheets

IMAGE FORMAT CONVERSION SYSTEM

BACKGROUND OF THE INVENTION

1. Field of the Invention

The present invention relates to the technical field of image processing and, more particularly, to an image format conversion system.

2. Description of Related Art

The resolution of video source in a liquid crystal display television (LCD TV) is typically a constant. Accordingly, for a display on different resolution panels, image of a video source has to be scaled for being properly displayed on the different resolution panels. In this case, U.S. Pat. No. 5,739,867 has disclosed an upscaler for a display with an LCD panel.

Figure 1:
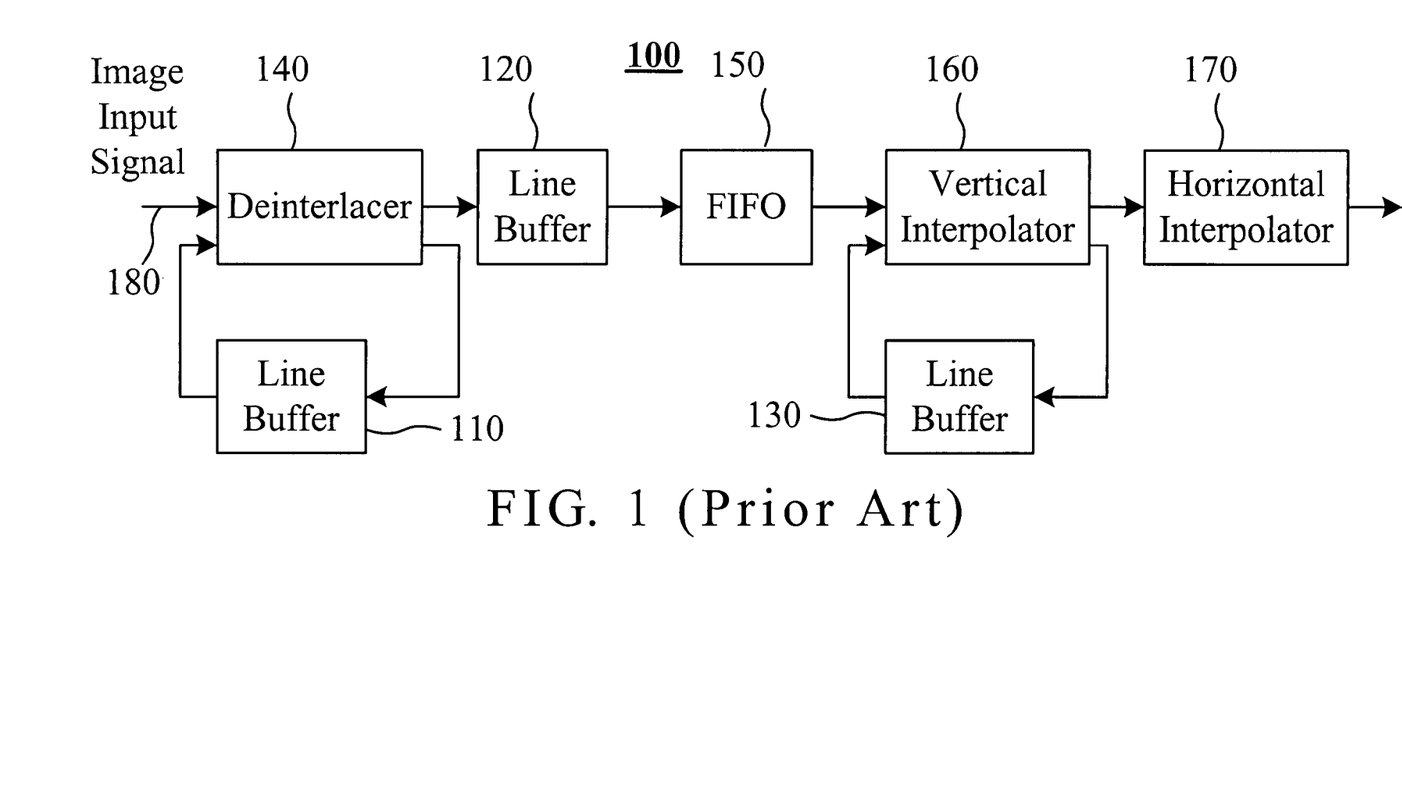
FIG. 1 is a block diagram of a typical scaler.

FIG. 1 is a block diagram of a typical scaler 100. As shown in FIG. 1, the typical scaler 100 essentially replaces frame buffers with line buffers 110, 120, 130. In addition, the operating clocks of deinterlacer 140, FIFO 150, vertical interpolator 160 and horizontal interpolator 170 are generated by applying an image input signal 180 to a frequency multiplier (not shown).

Since the frame buffers are replaced with the line buffers 110, 120, 130, the die size becomes smaller. In addition, because the operating clock is derived from the frequency of the image input signal 180, the phases of the operating clocks of the deinterlacer 140, vertical interpolator 160 and horizontal interpolator 170 have a better synchronization in comparison with the phase of the image input signal 180.

However, due to the line buffers 110, 120, 130 used in the typical scaler, the resolution of the image input signal 180 is limited. Namely, the image input signal 180 must have a horizontal resolution smaller than the available length of the line buffers 110, 120 and 130. Accordingly, the horizontal resolution of the image input signal 180 is gradually increased as the image format is frequently changed, and such a scaler cannot conform with the requirement of scaling operation on an image input signal with a new format.

Figure 2:
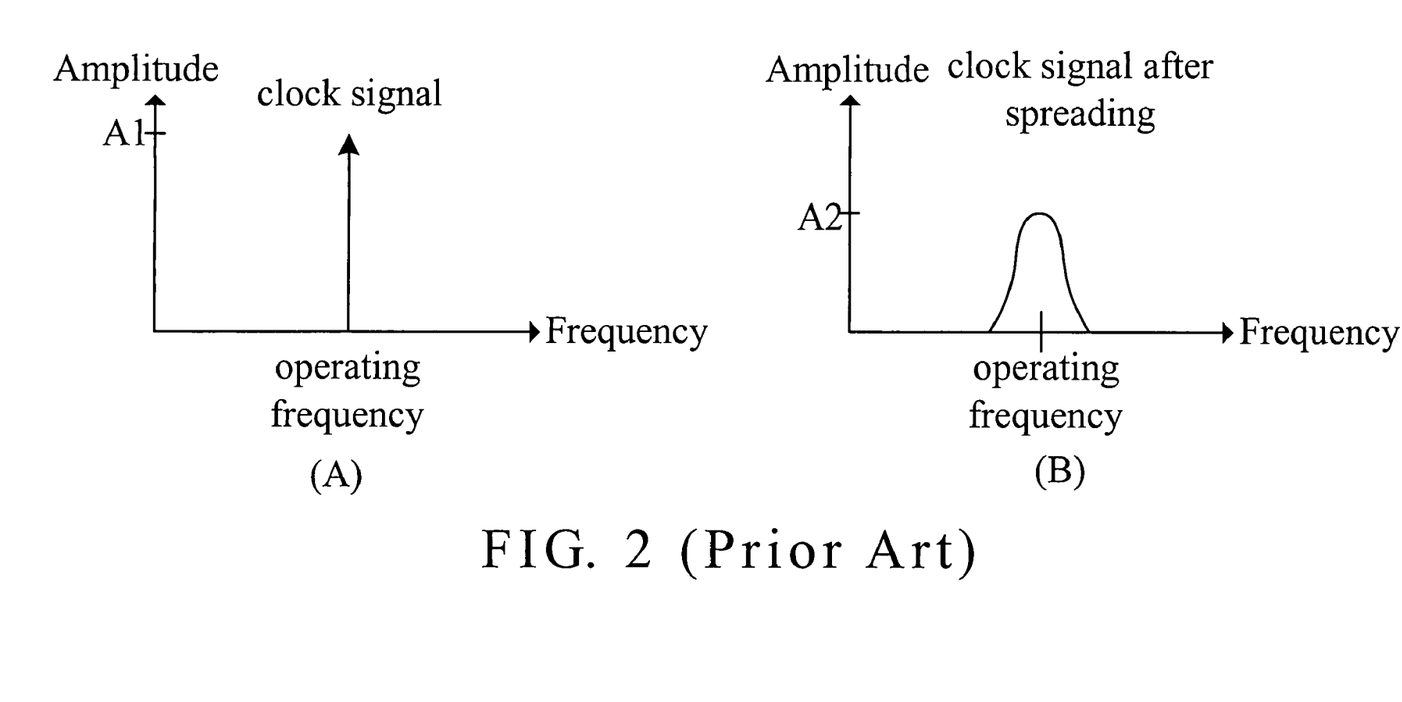
FIG. 2 is a schematic graph of a typical clock signal spread spectrum.

Further, for electromagnetic interference (EMI) reduction, the clock signal is typically performed with a spread spectrum operation. FIG. 2 is a schematic graph of a typical clock signal spread spectrum. As shown in FIG. 2(A), a clock signal before spreading presents a single-frequency signal in the operating frequency range. As shown in FIG. 2(B), the clock signal after spreading (spreading chips) presents a multi-frequency signal in the operating frequency range, which reduces the amplitude of the clock signal through the spread spectrum technique to thereby reduce the electromagnetic interference. However, owing to the frequency range of the clock signal is widen after spreading, the phase lock loop (PLL) takes more time to lock the frequency of an input signal, and even it cannot lock the frequency of the input signal. In this case, the difficulty in designing the PLL circuitry is thus increased. In addition, when the input signal is unsteady or the frequency range of the clock signal is overlarge after spreading, an abnormal picture possibly occurs.

Therefore, it is desirable to provide an improved image format conversion system to mitigate and/or obviate the aforementioned problems.

SUMMARY OF THE INVENTION

An object of the present invention is to provide an image format conversion system, which can perform a scaling operation on input signals with different image formats to thereby increase the added value on the system. The invention integrates the scaling operation and the deinterlacing operation into a 2D image interpolator to thereby save the memory use and the operational circuitry area.

Another object of the present invention is to provide an image format conversion system, which can overcome the abnormal picture caused by the clock signal spread spectrum in the prior art.

According to a feature of the invention, an image format conversion system is provided. The system includes a horizontal filter, a first first-in-first-out (FIFO), a 2D image interpolator, a second FIFO and an interpolation clock controller. The horizontal filter receives an image input signal with a frequency of a first clock signal in order to perform a filtering operation on the image input signal to thereby produce a horizontal filtering image signal. The first FIFO is connected to the horizontal filter in order to temporarily store the horizontal filtering image signal. The 2D image interpolator is connected to the first FIFO in order to perform a deinterlacing, a vertical interpolation and a horizontal interpolation operations on the horizontal filtering image signal to further produce a scaled progressive image signal. The second FIFO is connected to the 2D image interpolator in order to temporarily store the scaled progressive image signal. The interpolation clock controller is connected to the horizontal filter, the first FIFO, the 2D image interpolator and the second FIFO in order to receive a second clock signal and produce multiple enable signals to thereby enable the horizontal filter and the 2D image interpolator, wherein the second clock signal has a frequency independent of the frequency of the first clock signal.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
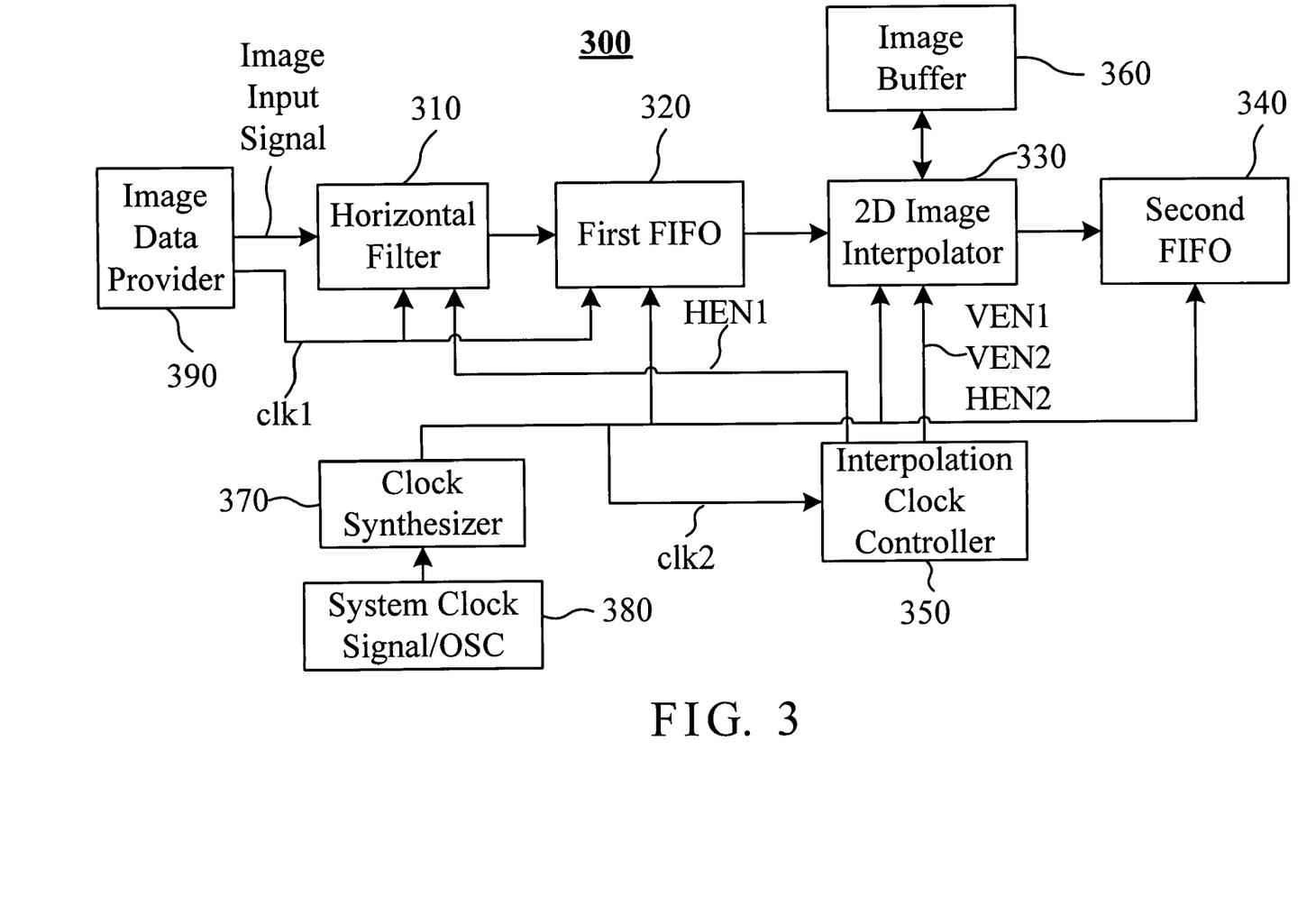
FIG. 3 is a block diagram of an image format conversion system according to the invention.

FIG. 3 is a block diagram of an image format conversion system 300 according to the invention. The system 300 includes a horizontal filter 310, a first first-in-first-out (FIFO) 320, a 2D image interpolator 330, a second FIFO 340, an interpolation clock controller 350, an image buffer 360 and a clock synthesizer 370.

The horizontal filter 310 receives an image input signal with a frequency of a first clock signal in order to perform a filtering operation on the image input signal to thereby produce a horizontal filtering image signal. The first FIFO 320 is connected to the horizontal filter 310 in order to temporarily store the horizontal filtering image signal.

The image input signal received by the horizontal filter 310 can be provided by an image data provider 390. The image data provider 390 can be a network device or a storage device. The image data provider 390 also provides the first clock signal clk1 to the horizontal filter 310 and the first FIFO 320 with the clock signal at operation.

The 2D image interpolator 330 is connected to the first FIFO 320 in order to perform deinterlacing, vertical interpolation and horizontal interpolation operations on the horizontal filtering image signal to thereby produce a scaled progressive image signal.

The second FIFO 350 is connected to the 2D image interpolator 330 in order to temporarily store the scaled progressive image signal.

The interpolation clock controller 350 is connected to the horizontal filter 310, the first FIFO 320, the 2D image interpolator 330 and the second FIFO 340 in order to receive a second clock signal clk2 and produce multiple enable signals to thereby enable the horizontal filter 310 and the 2D image interpolator 330. The second clock signal clk2 has a frequency independent of the frequency of the first clock signal clk1.

The clock synthesizer 370 is connected to the first FIFO 320, the 2D image interpolator 330, the second FIFO 340 and the interpolation clock controller 350. The clock synthesizer 370 is based on a third clock signal to synthesize the second clock signal clk2. The third clock signal is a system clock signal or a clock signal generated by an oscillator 380.

The first FIFO 320 receives the first clock signal clk1 and the second clock signal clk2 respectively for providing the different clock domains. Thus, the 2D image interpolator 330, the second FIFO 340 and the interpolation clock controller 350 can be operated at the frequency of the second clock signal clk2 without causing an abnormal picture due to the clock signal is spread in the prior art.

Figure 4:
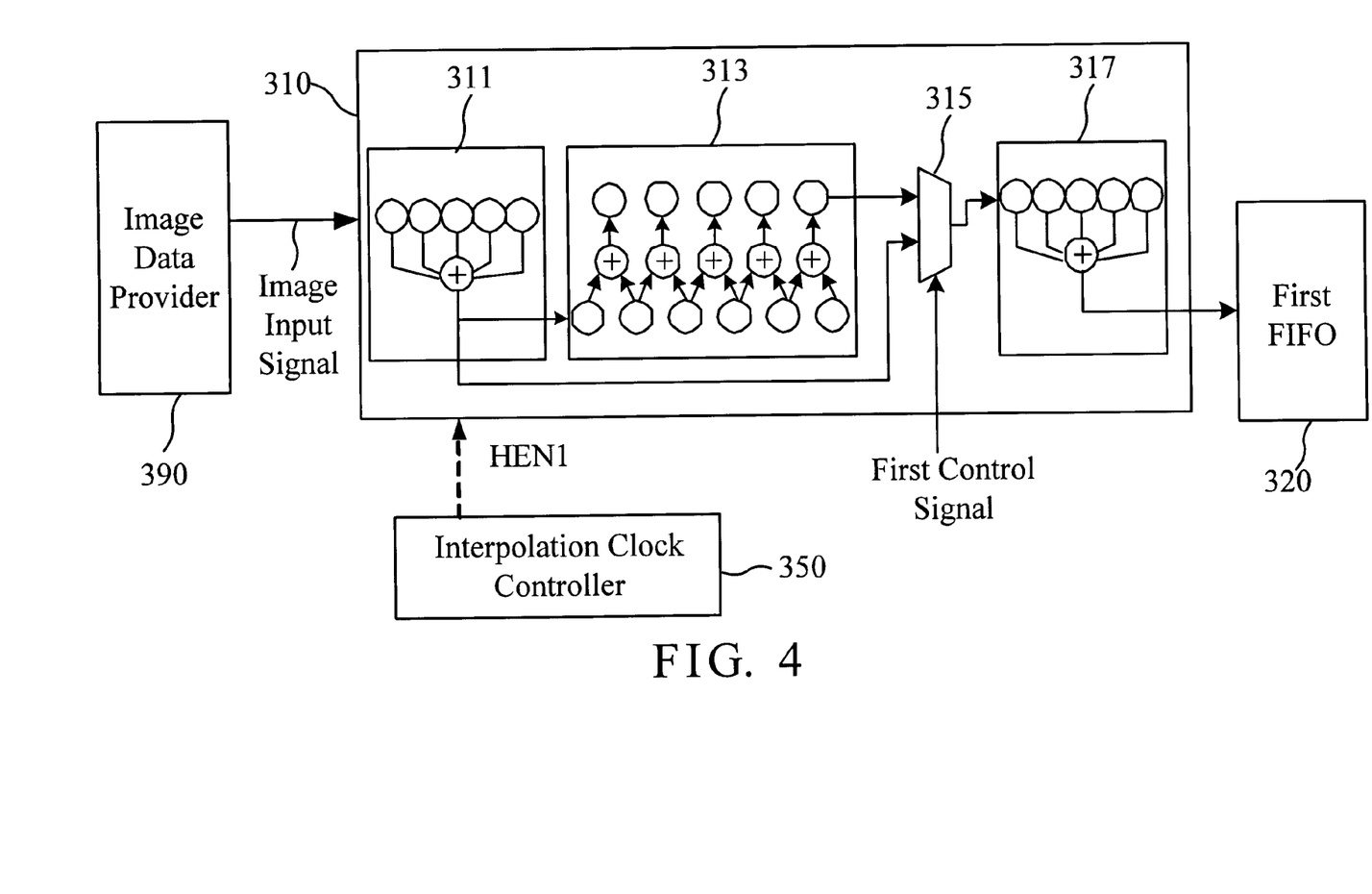
FIG. 4 is a block diagram of a horizontal filter according to the invention.

FIG. 4 is a block diagram of the horizontal filter 310 according to the invention. The horizontal filter 310 includes a pre-filter 311, a down-sampler 313, a first multiplexer 315 and a post-filter 317.

The pre-filter 311 performs a pre-filtering operation on the image input signal to thereby produce a pre-filtered image input signal. The pre-filtering operation is executed by, for example, averaging five pixels of a line from the image input signal to thereby produce the pre-filtered image input signal.

The down-sampler 313 is connected to the pre-filter 311 in order to perform a downsampling operation on the pre-filtered image input signal to thereby produce a downsampled image input signal. The downsampling operation is executed by, for example, merging two pixels of a line of the pre-filtered image input signal to thereby produce the downsampled image input signal.

The first multiplexer 315 is connected to the downsampler 313 and the pre-filter 311 in order to depend on a first control signal to select the pre-filtered image input signal or the downsampled image input signal as an output of the first multiplexer 315. When the downsampling operation is not required, the first control signal indicates that the pre-filtered image input signal is selected as the output of the first multiplexer 315. Conversely, when the downsampling operation is required, the first control signal indicates that the downsampled image input signal is selected as the output of the first multiplexer 315.

The post-filter 317 is connected to the first multiplexer 315 in order to perform a post-filtering operation on the output of the first multiplexer 315 to thereby produce the horizontal filtering image signal.

Figure 5:
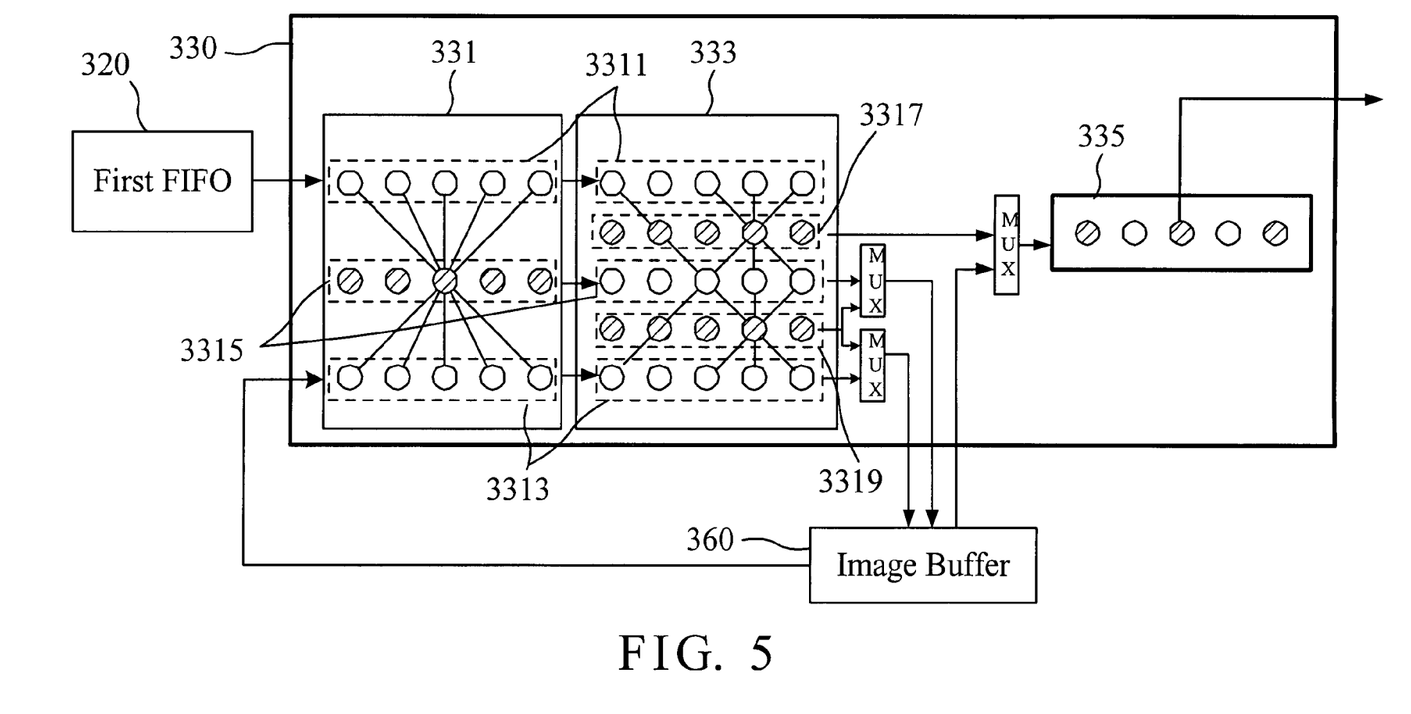
FIG. 5 is a block diagram of a 2D image interpolator according to the invention.

FIG. 5 is a block diagram of the 2D image interpolator 330 according to the invention. The 2D image interpolator 330 includes a deinterlacer 331, a vertical interpolator 333 and a horizontal interpolator 335.

The deinterlacer 331 is connected to the first FIFO 320 and the image buffer 360 in order to perform a deinterlacing operation on the horizontal filtering image signal to thereby produce a progressive image signal. The deinterlacing operation can perform an interpolation operation on two lines 3311, 3313 from the horizontal filtering image signal to thereby produce the progressive image signal.

The vertical interpolator 333 is connected to the deinterlacer 331 in order to perform a vertical interpolation operation on the progressive image signal to thereby produce a vertical scaling image signal. The vertical interpolation operation can perform an interpolation operation on two or more lines of the progressive image signal to thereby produce the vertical scaling image signal. The vertical interpolator 333 receives three lines 3311, 3313, 3315 provided by the deinterlacer 331 and produce the lines 3317, 3319 after the interpolation operation to thereby produce the vertical scaling image signal. Alternatively, the vertical interpolator 333 can perform a vertical downscaling operation by selecting one from two pixels of the lines 3311, 3313 or dividing an average of the pixels of the lines 3311, 3313 by two to thereby produce the vertical scaling image signal.

The horizontal interpolator 335 is connected to the vertical interpolator 333 in order to perform a horizontal interpolation operation on the vertical scaling image signal to thereby produce the scaled progressive image signal. The horizontal interpolation operation is executed by, for example, performing an interpolation operation on the pixels of a line of the progressive image signal to thereby produce the scaled progressive image signal. Alternatively, the horizontal interpolator 335 can perform a horizontal downscaling operation by selecting one from two adjacent pixels of a line or dividing an average of the two adjacent pixels by two to thereby produce the scaled progressive image signal.

Figure 6:
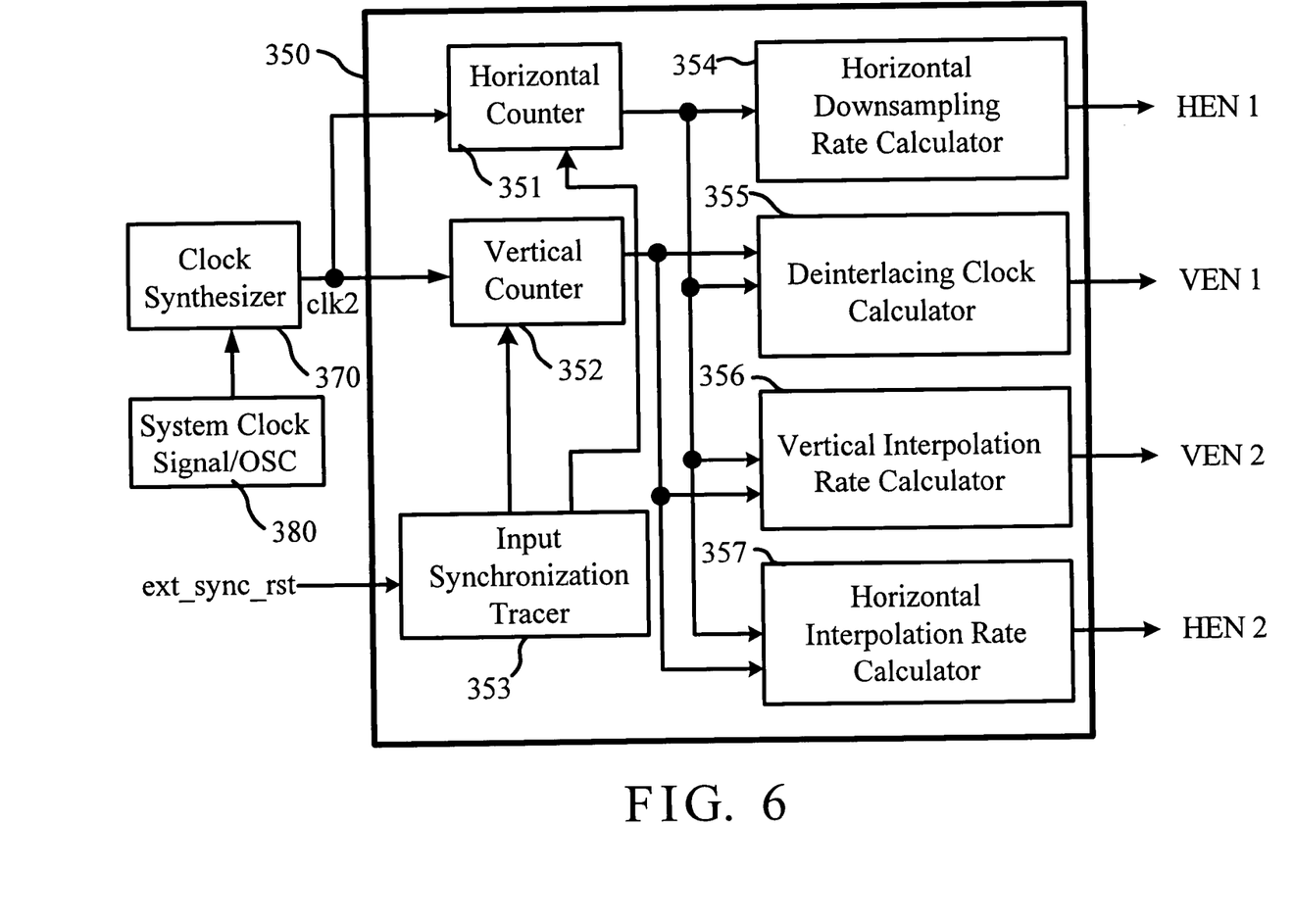
FIG. 6 is a block diagram of an interpolation clock controller according to the invention.

FIG. 6 is a block diagram of the interpolation clock controller 350 according to the invention. The interpolation clock controller 350 includes a horizontal counter 351, a vertical counter 352, an input synchronization tracer 353, a horizontal downsampling rate calculator 354, a deinterlacing clock calculator 355, a vertical interpolation rate calculator 356 and a horizontal interpolation rate calculator 357.

The horizontal counter 351 is connected to the clock synthesizer 370 in order to count the second clock signal clk2 to thereby produce a horizontal count signal.

The vertical counter 352 is connected to the clock synthesizer 370 in order to count the second clock signal clk2 to thereby produce a vertical count signal.

The input synchronization tracer 353 is connected to the horizontal counter 351 and the vertical counter 352 in order to receive an external synchronization reset signal ext_sync_rst to accordingly reset the horizontal counter 351 and the vertical counter 352.

The horizontal downsampling rate calculator 354 is connected to the horizontal counter 351 in order to produce a horizontal enable signal HEN1 based on the horizontal count signal.

The deinterlacing clock calculator 355 is connected to the horizontal counter 351 and the vertical counter 352 in order to produce a deinterlacing enable signal VEN1 based on the horizontal count signal and the vertical count signal.

The vertical interpolation rate calculator 356 is connected to the horizontal counter 351 and the vertical counter 352 in order to produce a vertical interpolation enable signal VEN2 based on the horizontal count signal and the vertical count signal.

The horizontal interpolation rate calculator 357 is connected to the horizontal counter 351 and the vertical counter 352 in order to produce a horizontal interpolation enable signal HEN2 based on the horizontal count signal and the vertical count signal.

Figure 7:
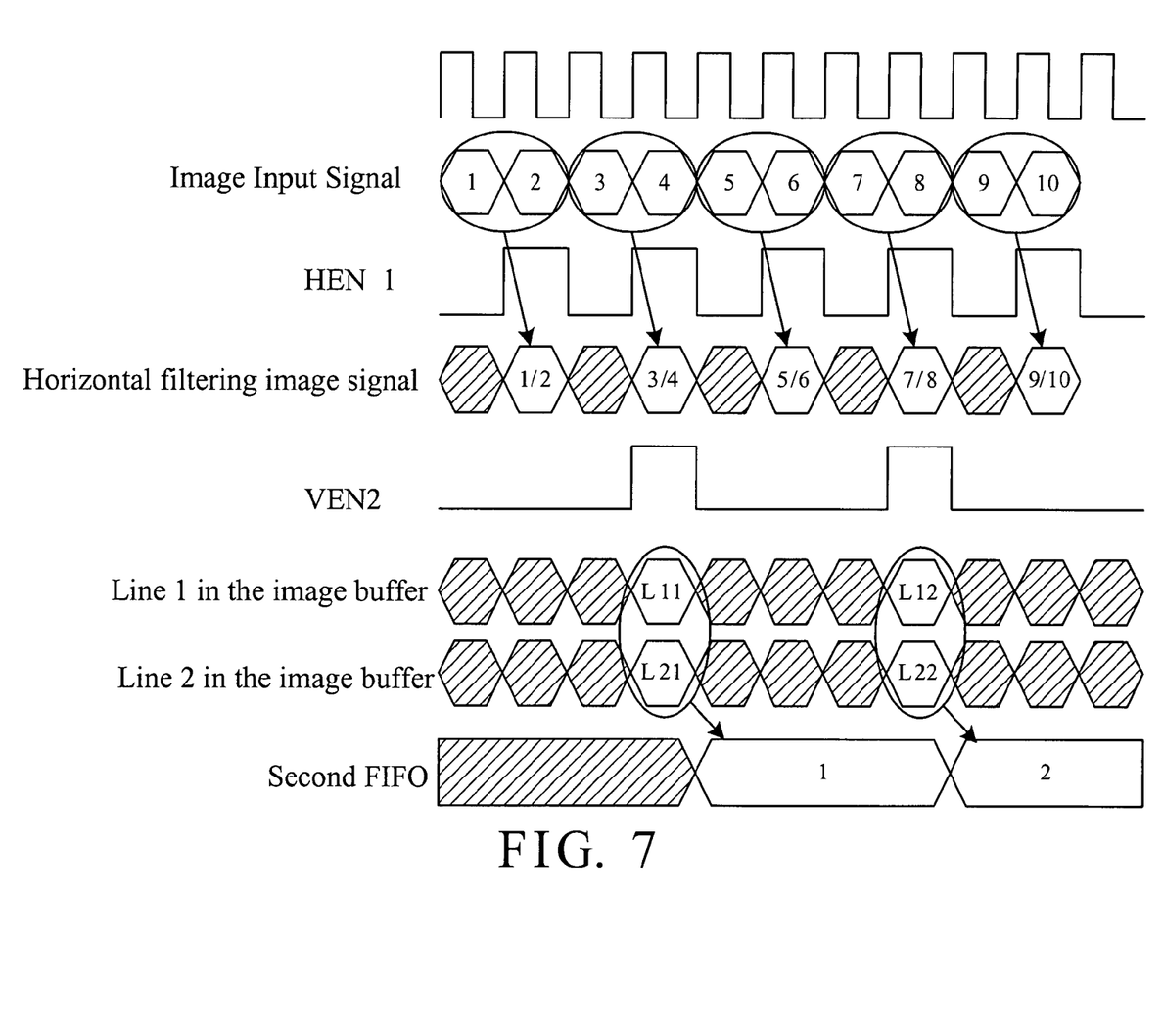
FIG. 7 is a schematic diagram of a data control according to the invention.

FIG. 7 is a schematic diagram of a data control according to the invention. As shown in FIG. 7, the image input signal includes Pixel 1 to Pixel 10. The downsampler 313 performs a downsampling operation with a ratio of 2:1 on the image input signal. Namely, Pixel 1 or Pixel 2 is selected, or the values of Pixel 1 and Pixel 2 are averaged and divided by two. When the horizontal enable signal HEN1 is at high voltage, the horizontal filter 310 outputs the horizontal filtering image signal to the first FIFO 320.

The vertical interpolator 333 performs a vertical downscaling operation on Line 1 and Line 2 from the image buffer 360 by selecting Pixel 2 of Line 1 or Pixel 2 of Line 2, or dividing a result by two, where the result is obtained by averaging the values of the pixels from Line 1 and Line 2. When the vertical interpolation enable signal VEN2 is at high voltage, the image buffer 360 outputs the scaled progressive image signal to the second FIFO 340.

As cited, the scaler in the prior art has an operating clock obtained by passing the frequency of an image input signal through a frequency doubler (not shown), and accordingly it is difficult to determine whether the scaler internally performs a spreading operation on the operating clock or not. Once the frequency of the image input signal is spread and the scaler internally performs the spreading operation again, it makes the spectrum of the operating clock become relatively large, and further the frequency of the input signal is not easily locked by the internal PLL circuit of the scaler, resulting in causing an abnormal picture. Conversely, when the frequency of the image input signal is not spread by the scaler, it is likely to cause the electromagnetic interference (EMI). The invention uses the clock synthesizer 370 to produce the second clock signal clk2 for the 2D image interpolator 330, the second FIFO 340 and the interpolator 350, and to perform the spreading operation on the second clock signal clk2. Accordingly, the problems of the EMI and whether or not the spreading operation is performed in the prior art are eliminated.

In addition, the invention uses the image buffer 360, and thus the limited resolution of the image input signal that is caused by the line buffers 110, 120, 130 of the scaler in the prior art can be improved. The invention uses the first FIFO 320 and the second FIFO 340 to separate the operating clock of the image format conversion system 300 from that of the image data provider 390 at the front end or that of the panel (not shown) at the rear end to thereby increase the system stability.

For eliminating the cost increase caused by the large sizes of the first FIFO 320 and the second FIFO 340, the invention uses the downsampler 313 to perform the downsampling operation on an image signal to thereby reduce the sizes of the first FIFO 320 and the second FIFO 340. Further, the scaling operation and the deinterlacing operation are integrated into the 2D image interpolator 330 to thereby reduce the size of the image buffer 360 and save the operational circuit area.

Although the present invention has been explained in relation to its preferred embodiment, it is to be understood that many other possible modifications and variations can be made without departing from the spirit and scope of the invention as hereinafter claimed.

What is claimed is:

1. An image format conversion system, comprising:
   a horizontal filter, for receiving an image input signal with a first clock signal to perform a filtering operation on the image input signal so as to produce a horizontal filtering image signal;
   a first first-in-first-out (FIFO), connected to the horizontal filter, for temporarily storing the horizontal filtering image signal;
   a 2D image interpolator, connected to the first FIFO, for performing a deinterlacing, a vertical interpolation and a horizontal interpolation operations on the horizontal filtering image signal so as to produce a scaled progressive image signal;
   a second FIFO, connected to the 2D image interpolator, for temporarily storing the scaled progressive image signal; and
   an interpolation clock controller, connected to the horizontal filter, the first FIFO, the 2D image interpolator and the second FIFO, for receiving a second clock signal and producing multiple enable signals to thereby enable the horizontal filter and the 2D image interpolator,
   wherein the second clock signal and the first clock signal are mutually independent.

2. The system as claimed in claim 1, further comprising an image buffer connected to the 2D image interpolator, for temporarily storing the output of 2D image interpolator.

3. The system as claimed in claim 2, further comprising a clock synthesizer connected to the first FIFO, the 2D image interpolator, the second FIFO and the interpolation clock controller for producing the second clock signal based on a third clock signal.

4. The system as claimed in claim 3, wherein the horizontal filter comprises:
   a pre-filter, for performing a pre-filtering operation on the image input signal to thereby produce a pre-filtered image input signal;
   a downsampler, connected to the pre-filter, for performing a downsampling operation on the pre-filtered image input signal to thereby produce a downsampled image input signal;
   a first multiplexer, connected to the downsampler and the pre-filter, for selecting the pre-filtered image input signal or the downsampled image input signal for output according to a first control signal; and
   a post-filter, connected to the first multiplexer, for performing a post-filtering operation on the output of first multiplexer to thereby produce the horizontal filtering image signal.

5. The system as claimed in claim 4, wherein the 2D image interpolator comprises:
   a deinterlacer, connected to the first FIFO and the image buffer, for performing a deinterlacing operation on the horizontal filtering image signal to thereby produce a progressive image signal;
   a vertical interpolator, connected to the deinterlacer, for performing a vertical interpolation operation on the progressive image signal to thereby produce a vertical scaling image signal; and
   a horizontal interpolator, connected to the vertical interpolator, for performing a horizontal interpolation operation on the vertical scaling image signal to thereby produce the scaled progressive image signal.

6. The system as claimed in claim 5, wherein the interpolation clock controller comprises:
- a horizontal counter, connected to the clock synthesizer, for counting the second clock signal to thereby produce a horizontal count signal;
- a vertical counter, connected to the clock synthesizer, for counting the second clock signal to thereby produce a vertical count signal;
- an input synchronization tracer, connected to the horizontal counter and the vertical counter, for receiving an external synchronization reset signal to accordingly reset the horizontal counter and the vertical counter;
- a horizontal downsampling rate calculator connected to the horizontal counter for producing a horizontal enable signal according to the horizontal count signal;
- a deinterlacing clock calculator connected to the horizontal counter and the vertical counter for producing a deinterlacing enable signal according to the horizontal count signal and the vertical count signal;
- a vertical interpolation rate calculator, connected to the horizontal counter and the vertical counter, for producing a vertical interpolation enable signal according to the horizontal count signal and the vertical count signal; and
- a horizontal interpolation rate calculator connected to the horizontal counter and the vertical counter for producing a horizontal interpolation enable signal based on the horizontal count signal and the vertical count signal.

7. The system as claimed in claim 6, wherein the third clock signal is a system clock signal.

8. The system as claimed in claim 6, wherein the third clock signal is generated by an oscillator.

9. The system as claimed in claim 4, wherein the horizontal filter pre-filters the image input signal to thereby produce a pre-filtered image input signal, down-samples the pre-filtered image input signal to thereby produce a downsampled image input signal, selects the pre-filtered image input signal or the downsampled image input signal for output according to a first control signal, and post-filters the selected output to produce the horizontal filtering image signal.

10. The system as claimed in claim 5, wherein the 2D image interpolator deinterlaces the horizontal filtering image signal to thereby produce a progressive image signal, performs a vertical interpolation operation on the progressive image signal to thereby produce a vertical scaling image signal, and performs a horizontal interpolation operation on the vertical scaling image signal to thereby produce the scaled progressive image signal.

\* \* \* \* \*